Feb. 16, 1954      L. B. RIES      2,669,029

LEVEL

Filed March 31, 1952

INVENTOR
Lewis B. Ries
BY *Shoemaker & Mattare*

ATTORNEYS

Patented Feb. 16, 1954

2,669,029

UNITED STATES PATENT OFFICE 2,669,029

LEVEL

Lewis B. Ries, Monessen, Pa.

Application March 31, 1952, Serial No. 279,597

2 Claims. (Cl. 33—206)

This invention relates to a level of the type used by carpenters, brick layers and other artisans for determining whether a structure or article being built or made is level or a surface thereof is accurately disposed at a predetermined angle or pitch.

More specifically the level is of the type wherein a bar or elongated body is formed with a transverse opening intermediate its length in which is mounted a transparent container visible from either side of the bar and partially filled with liquid which flows freely in the container or gauge member and cooperating with scale markings arranged in circular paths concentric with opposite side faces of the container for indicating the angular disposition of a surface upon which the level rests.

Such levels have not been found satisfactory due to the fact that the liquid container is liable to slip and turn out of its proper position and it is, therefore, one object of the present invention to provide a level having a container or glass of improved formation which is mounted in the bar or body of the level in an improved manner and thereby firmly anchored against turning movements out of its proper position.

Another object of the invention is to provide the liquid holding container or glass with improved means for cushioning the container against damage by shocks if the level is dropped.

Another object of the invention is to so form the anchoring member and so apply the cushioning member that the anchors will hold the cushioning member about the container and prevent it from slipping out of place about the container.

Another object of the invention is to provide the container or glass with improved anchoring members of such shape that the recesses to receive the same may be very easily found in the level body in spaced relation to each other circumferentially of the glass-receiving opening or socket and the anchoring members very easily pressed into the recesses while fitting the container into the opening.

Another object of the invention is to so form the glass-receiving opening or socket that after the glass has been fitted therein, transparent discs serving as dirt shields may be fitted into enlarged ends of the socket against shoulders where the discs are firmly held by putty which may be easily removed if a disc is broken and a new disc applied.

With these and other objects in view, the improved level consists of an improved construction and arrangement of parts, and practical embodiment of which is illustrated in the accompanying drawings wherein.

Figure 1:
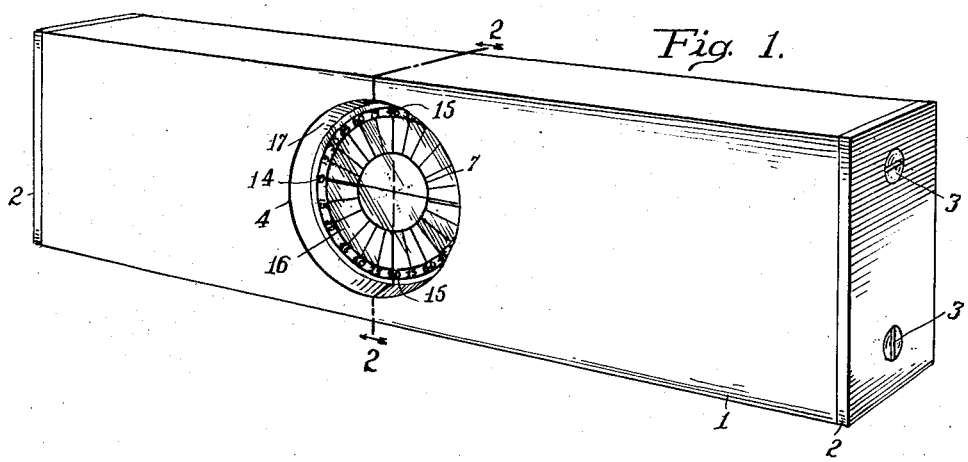
Figure 1 is a perspective view of the improved level.
Figure 3:
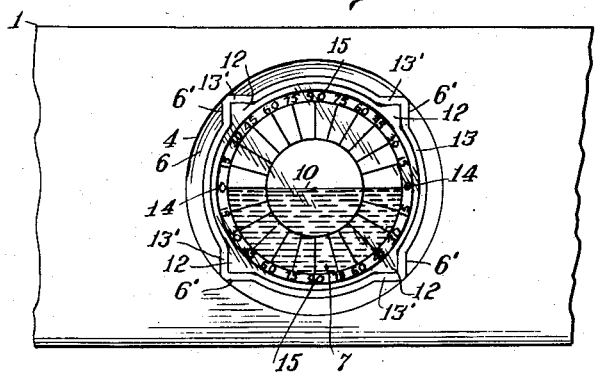
Figure 3 is a fragmentary view looking at one side of the level with the glass plate shielding the guage removed.

The body or bar 1 of this improved level may be formed of wood, metal or any other suitable material and its ends are shielded by the usual plates 2 secured by screws 3. Midway its length the bar is formed with a circular opening 4 which extends transversely through the bar the entire thickness thereof and midway its ends is of reduced diameter in order to form a circumferentially extending shoulder 5 having flat side faces constituting ledges 6. These ledges or side faces are of sufficient width to effectively serve as abutment surfaces and through the shoulder are formed recesses 6' which are spaced from each other equal distances circumferentially of the shoulder and are V-shaped or triangular as shown in Figure 3 and extend the full width of the ledges. Since the recesses are triangular, they may be cut by means of a rectangular cutter having its cutting end disposed against a side face of the shoulder with a corner bearing against a portion of the angular wall of the opening.

Figure 4:
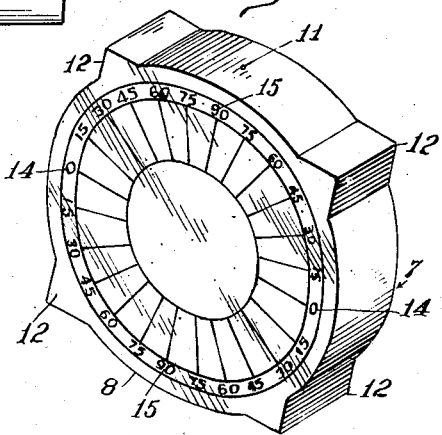
Figure 4 is a perspective view of the guage mounted in the bar of the level.
Figure 2:
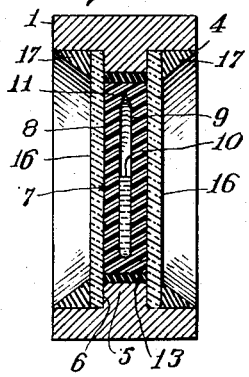
Figure 2 is a transverse sectional view taken along the line 2—2 of Figure 1.

The guage member which is shown in Figure 4 and indicated in general by the numeral 7 is fitted into the opening 4 through either end thereof and when installed is disposed in concentric relation to the shoulder 5. This guage member consists of a hollow container 8 which is circular and may be formed of plastic, glass or any other suitable transparent material. The chamber 9 of this container is quite narrow, as shown in Figure 2, and conforms to the circular shape of the container. A liquid 10, which is preferably mercury, is poured into the chamber 9 through a filling opening which is then sealed as shown at 11 in Figure 2. Referring to this figure and to other figures of the drawing, it will be seen that the volume of the liquid is such that it half fills the chamber. Therefore, when the indicator or guage member is installed in the opening and the bar set at rest upon a level surface, the flat upper surface of this liquid material will extend along the horizontal diameter of the container, and as the mercury may flow freely in the chamber, the upper surface of this liquid will at all times remain in the horizontal position.

Lugs 12 which are triangular when viewed in end elevation or in cross section are formed integral with the container and project radially from the peripheral edge face of the container in such spaced relation to each other circumferentially thereof that when the container is fitted into the opening in the bar, the lugs fit into the triangular recesses 6'. These lugs 12 are solid so that they will not be easily broken and are of such length that they extend entirely across the circumferentially extending edge face of the container and have their end faces flush with opposite side faces of the container.

Before the gauge member or container is installed, a rubber band 13 is fitted about the container circumferentially thereof. The rubber band is of a width of the peripheral edge face of the container and is of such dimensions that it must be expanded in order to fit it about the container circumferentially thereof. In spaced relation to each other, the band is formed with outstanding V-shaped portions 13' which are of such dimensions that they are disposed in straddling close fitting engagement with the lugs 12. Portions of the band between its V-shaped portions have close fitting engagement with the portions of the peripheral surface of the container between the lugs 12. The container and the rubber band may, therefore, be fitted into the central portion of the opening 4 and the container will be in concentric relation to the shoulder 5. Since the rubber band is stretched somewhat when applied to the container, it has frictional binding engagement with the container as well as with the annular surface of the shoulder. In addition, portions of the rubber band have frictional gripping engagement with the side faces of the lugs and walls of the triangular recesses into which the lugs fit. The band may be fixedly secured to the lugs and portions of the container between the lugs by an adhesive, or in any other desired manner and thus be prevented from slipping transversely out of its proper position about the container while pressing the container into the opening. The rubber band serves very effectively as a shock absorber to prevent damage to the container in case the level should be dropped. In addition, the rubber band will assist in preventing movements of the container circumferentially thereof and the zero marks 14 of the scales formed upon opposite side faces of the container will be maintained in a horizontal plane when the level is resting upon a level surface. While it has been stated that the rubber band is circular and formed with circumferentially spaced V-shaped projections to straddle the triangular lugs, it will be understood that the rubber band may be formed without the V-shaped projections. In such case, the band is fitted about the container with portions contacting ridges of the lugs and portions pressed inwardly against the peripheral surface of the container between the lugs while inserting the container into the opening.

The scale markings follow a circular path concentric with the center of the container and have their 90° marks 15 at opposite ends of the vertical diameter of the container. All of the guage markings extend radially of the side faces of the container between the horizontal diameter having zero marks at its ends and the vertical diameter having the 90° marks at its ends, and it will be understood that any number or such scale markings may be provided between the zero marks and the 90° marks which will allow the guage to be accurately read. The scale markings are coated with luminous paint so that they may be clearly seen.

The level upper surface of the mercury extends horizontally between the zero marks when the bar is resting upon a level surface, and when the bar is tilted longitudinally, the position of the upper surface of the mercury relative to the scale markings above or below the zero marks will accurately indicate the angular disposition of the surface upon which the bar rests.

In order to seal the guage, there have been provided transparent discs 16 which may be formed of glass, plastic or any other suitable material. These discs or seals are of a diameter adapting them to fit snugly within the end portions of the opening 4, and after they have been inserted, they are thrust inwardly until they have flat contacting engagement with the side faces of the ledges 6 of the shoulder 5 and with the flat end faces of the lugs 12. In addition, the discs bear against side edges of the rubber band and are cushioned against shocks. Putty 17 is then applied, as shown in Figure 2, and serves to firmly hold the discs in place as well as serving as seals to prevent water or dust from working inwardly around marginal edges of the discs and interfering with a clear view of the scale markings and the liquid. In case the discs should be broken, it is merely necessary to remove the putty and new discs may be installed and putty again applied to hold them in place.

What I claim is:

1. A level comprising a bar formed with a transversely extending circular opening abruptly reduced in diameter midway its length and thereby providing an annular shoulder spaced equal distances from opposite ends of the opening, said shoulder having flat side faces constituting circular ledges and also having a transversely flat annular edge face, the shoulder being formed with triangular recesses spaced from each other equal distances circumferentially of the shoulder, said recesses extending the full width and thickness of the shoulder and tapered outwardly and having flat walls intersecting at the annular wall of the opening, a gauge consisting of a circular transparent container fitting into the reduced portion of said opening and formed with a narrow circular chamber concentric with the container, said container being of the same thickness as said shoulder and having flat side faces flush with the ledges at opposite sides of the shoulder, each of the said side faces of said container bearing scale markings arranged in a circular path concentric with the container and having zero marks at opposite ends of a horizontal diameter of the container and 90° marks at ends of a vertical diameter of the container, lugs projecting radially from said container and fitting into said recesses, said lugs being solid and integral with the container and triangular in cross section and extending the full width of the peripheral edge face of the container, the said lugs having flat end faces flush with the side faces of the container and also flush with the ledges at opposite sides of the shoulder, a rubber band fitting about said container circumferentially thereof in stretched condition, said band being of a width corresponding to the thickness of the container and having outstanding V-shaped portions straddling the lugs and confined in the recesses by the lugs and other portions in close fitting contacting engagement with arcuate portions of the peripheral edge face of the container between the lugs having gripping engagement with the container and confronting portions of the annular wall of the opening, liquid in the chamber of said container half filling the same and having a flat horizontally disposed upper surface extending between the zero marks of the scales when the bar is resting upon a horizontally extending level surface, the liquid being freely movable in the chamber of the container and cooperating with the scale marking to indicate angular positions of the bar and a surface upon which the bar rests, transparent discs fitting snugly in end portions of the openings and having flat contacting engagement with the ledges and ends of the lugs and side edges of the rubber band, and putty in opposite end portions of said opening extending circumferentially therein and overlying marginal portions of the discs to hold the discs firmly in place and form tight seals about marginal edges of the discs.

2. A level comprising a bar formed midway its length with a transverse circular opening abruptly reduced in diameter in spaced relation to opposite sides of the bar and thereby providing an annular shoulder about the opening having flat side faces constituting annular ledges spaced equal distances from opposite ends of the opening, said shoulder being formed for its full thickness with circumferentially spaced V-shaped recesses tapered toward the annular wall of the opening, a circular gauge consisting of a hollow transparent container fitting snugly in the reduced portion of said opening and provided with solid radially projecting lugs integral with and extending entirely across its marginal edge face and conforming to the taper of said recesses and fitting into the said recesses, said container having flat side faces flush with opposite side faces of said shoulder and provided with circumferentially spaced scale markings progressing from zero at opposite ends of a horizontal diameter of the container to 90° at opposite ends of a vertical diameter of the container, liquid in said container movable freely therein circumferentially of the gauge and having a flat upper surface cooperating with the scale markings to indicate angular disposition of the level, an elastic band fitting about said container circumferentially thereof and having positions straddling the lugs within the recesses and other portions in flat contacting engagement with portions of the marginal face of the container between the lugs and constituting a cushioning member, transparent discs in end portions of the opening having inner side faces in flat contacting engagement with the ledges and opposite sides of the container and its lugs and serving to prevent movement of the container out of its position within the reduced portion of the opening, and securing means for said transparent discs.

LEWIS B. RIES.

References Cited in the file of this patent
UNITED STATES PATENTS

| Number | Name | Date |
|---|---|---|
| 777,641 | Knighton | Dec. 13, 1904 |
| 1,823,524 | Beecher et al. | Sept. 15, 1931 |
| 2,487,245 | Hubbard | Nov. 8, 1949 |
| 2,514,500 | Kroener | July 11, 1950 |